United States Patent [19]

Reinhart et al.

[11] Patent Number: 5,538,415
[45] Date of Patent: Jul. 23, 1996

[54] OPEN FRAME INJECTION MOLDING MACHINE

[75] Inventors: William A. Reinhart, Georgetown; Lawrence J. Navarre, Cincinnati, both of Ohio

[73] Assignee: Cincinnati Milacron Inc., Cincinnati, Ohio

[21] Appl. No.: 354,175

[22] Filed: Dec. 12, 1994

[51] Int. Cl.⁶ ............................................. B29C 45/64
[52] U.S. Cl. ...................... 425/589; 425/451.6; 425/593
[58] Field of Search .................................. 425/589, 592, 425/593, 451.5, 451.6

[56] References Cited

U.S. PATENT DOCUMENTS

| | | | |
|---|---|---|---|
| 3,890,308 | 6/1975 | Collins | 425/242 |
| 3,924,987 | 12/1975 | Mehnert | 425/451.5 |
| 4,202,522 | 5/1980 | Hanas et al. | 249/102 |
| 4,222,731 | 9/1980 | Enriette et al. | 425/451.5 |
| 5,110,283 | 5/1992 | Bluml et al. | 425/589 |
| 5,249,951 | 10/1993 | Leonhartsberger et al. | 425/589 |
| 5,297,952 | 3/1994 | Leonhartsberger | 425/593 |
| 5,332,385 | 7/1994 | Leonhartsberger | 425/589 |

*Primary Examiner*—Tim Heitbrink
*Attorney, Agent, or Firm*—Stephen H. Friskney

[57] ABSTRACT

An injection molding machine is provided with an open frame specifically designed to avoid angular displacement of the stationary platen during the molding process. More particularly, the stationary platen and the supporting frame are configured to maintain a constant moment of inertia relative to the line of force acting on the platen during the clamp closed part of the cycle, so that it displaces linearly when force is applied. In addition, the frame is provided with integral support members to connect with the die height adjustment mechanism. The support members are positioned on the frame to minimize the distance of the open frame, thus minimizing the length of frame subject to deflection when the force is applied.

6 Claims, 3 Drawing Sheets

5,538,415

OPEN FRAME INJECTION MOLDING MACHINE

BACKGROUND OF THE INVENTION

1. Field of the Invention

The present invention relates generally to clamp mechanisms for injection molding machines and more particularly to the frame structure and die height adjustment mechanism for injection molding machines without tie bars between platens.

2. Description of the Related Art

Injection molding machines have traditionally been designed to use hydraulic systems as their primary source of motive power. Although the hydraulics in molding machines have proven to be satisfactory over the years, such systems do have several inherent disadvantages. The hydraulic oil is subject to dirt and contamination in an industrial environment and requires filtering and maintenance. Further, there is the potential for oil leakage making them unsuitable for "clean room" manufacturing environments, and possibly contaminating the soil and groundwater over time. The hydraulic drive has limited positioning accuracy and repeatability, and changes in temperature of the hydraulic oil will lead to further variations in performance. Finally, the hydraulic drive is not energy efficient, and therefore, it requires heat exchangers and coolers to remove heat from the oil in order to maintain a constant oil temperature for stable performance.

Electric motor servomechanism drives provide an alternative to hydraulics and have been available for many years. With the recent advances in motor technology, and improvements in clamp mechanisms, there has been increasing interest in molding machines which are completely powered by electric motors (all-electric machines). Combining the state of the art in electric motors with reliable mechanical drive systems provides a machine that is clean, quiet, precise, energy efficient and has repeatable performance.

There has also been increasing interest in providing easier access to the mold mounting surfaces of an injection molding machine. In addition to the size of the mold itself, there are typically cooling lines, core mechanisms and other ancillary devices attached to the mold body. In a conventional molding machine (with tie bars), all or part of the attached equipment may have to be removed and/or the mold will have to be manipulated to fit between the tie bars so that it can be attached to the mounting surface. One solution, particularly on the smaller tonnage machines, has been to forgo the use of tie bars between platens and rely on the machine frame to provide the structure required to withstand the forces generated during the molding process. For convenience, this type of molding machine will be referred to herein as an "open frame" injection molding machine.

Although the open frame machines have found some measure of success, there have been certain drawbacks. Most noticeably, angular deflection of the "stationary" mold mounting surface occurs when the desired tonnage is applied to hold the mold closed during injection; such deflection can result in unsatisfactory parts production and excessive mold wear. Prior art open frame machines have attempted to compensate for this deflection by providing means to pivot slightly one or both of the mold mounting surfaces. However, this approach has not been completely satisfactory since the performance remains inconsistent due to the difficulties associated with aligning the mold sections and maintaining uniform pressure on the mold. Uniform pressure is particularly important to avoid localized "flash" at the parting line and other part quality variations, such as part weight, in multiple cavity molds. Prior art systems also tend to generate significant wear of the mold surfaces and alignment pins, resulting in more frequent mold maintenance.

A further drawback to the open frame injection molding machine involves the difficulties associated with making the machine all-electric. For practical purposes, an all-electric molding machine must take advantage of the mechanical efficiencies of a toggle mechanism to achieve the required clamping forces and open/close the mold quickly. However, since a toggle mechanism has a fixed length of stroke, a die height adjustment mechanism must also be provided to accommodate molds of varying size. This presents a difficulty on the open frame machine since the more effective die height mechanisms have typically been combined or associated with the tie bars and rear platen in machines with the toggle type clamp mechanisms. In addition, prior art mechanisms are configured in a way that increases the overall length of the machine; this adds to the cost of the machine and reduces the inherent ability of the frame to maintain proper platen alignment. Accordingly, there is a need for an efficient die height adjustment mechanism for a toggle type (all-electric), open frame injection molding machine.

SUMMARY OF THE INVENTION

Applicants desire to simplify the clamp mechanism and structure of an open frame molding machine in order to take full advantage of the benefits associated with a molding machine without tie bars, while optimizing the operational flexibility of the machine. Accordingly, it is an object of the present invention to provide an open frame machine design that will avoid angular displacement of the mold mounting surfaces during the molding process.

It is a further object of the present invention to provide a die height adjustment mechanism that will accommodate the variety of mold sizes generally encountered, be compatible with an open frame molding machine construction, and minimize overall machine length.

The stated objects are accomplished by providing an injection molding machine that has a frame specifically designed to avoid angular displacement of the stationary platen during the molding process. More particularly, the end of the frame which supports the stationary platen is configured such that the moment of inertia at the mold mounting surface, relative to a line of force generated by the clamp mechanism, remains relatively constant as the force is applied (or removed). As a result, any displacement of the platen due to the applied force is parallel to the line of force. This can be achieved by various frame geometries, one embodiment being shown in the drawings. In addition, the frame is provided with integral support members which provide means for attaching the die height adjustment mechanism. The support members are positioned on the frame to minimize the distance of the "open" frame, thus minimizing the length of frame subject to deflection when the force is applied.

DESCRIPTION OF THE PREFERRED EMBODIMENT

Figure 1:
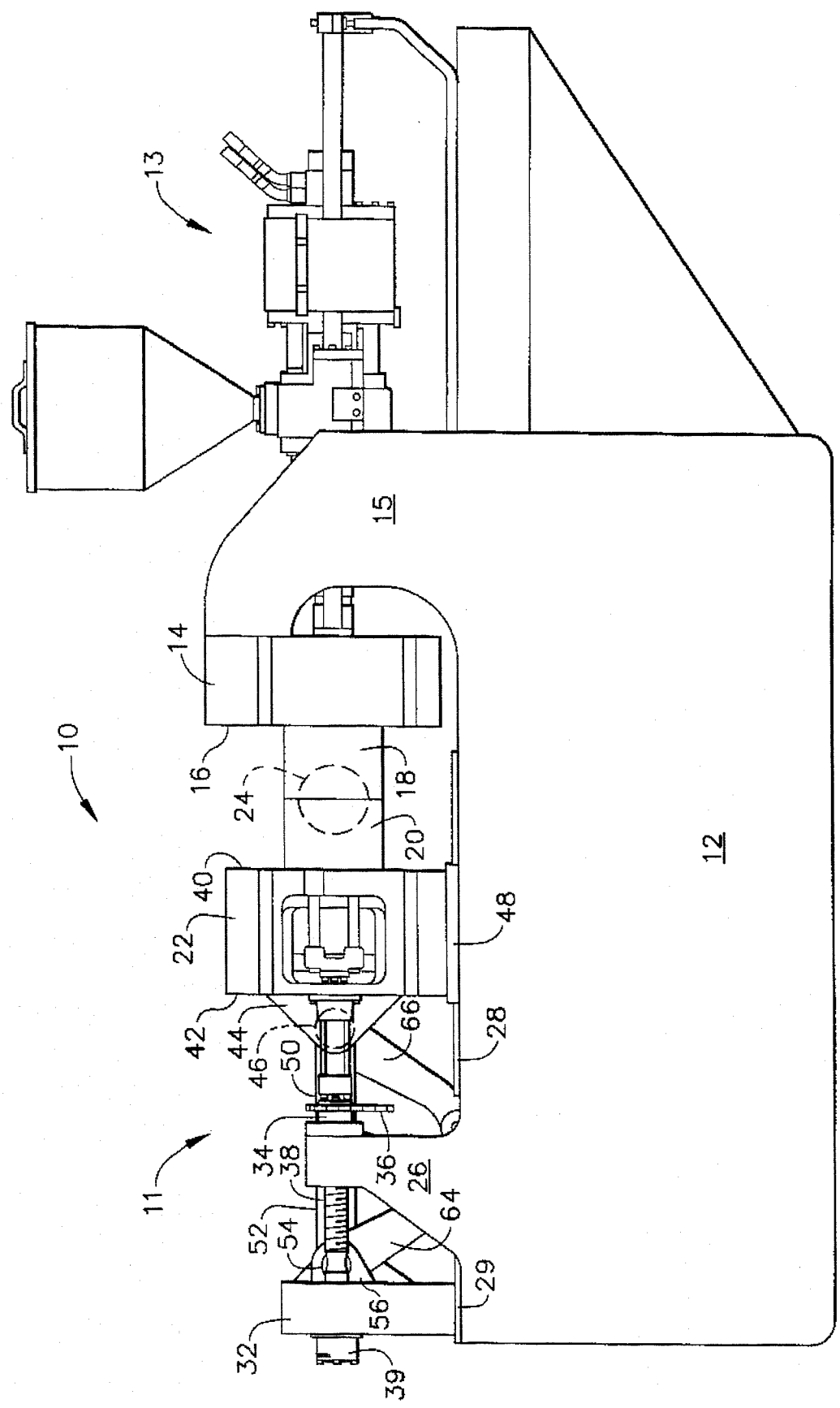
FIG. 1 is a side elevational view of an injection molding machine including a die height adjustment mechanism in accordance with the present invention, and showing a toggle clamping mechanism in its fully extended position with the mold portions in contact with each other.

Referring now to the drawings, and particularly to FIG. 1, there is shown an injection molding machine 10, the general structure of which will be described in some detail to clarify the interaction of the elements of the present invention. Specifically, the injection molding machine 10 includes a base or frame 12 that supports an injection unit 13 for plasticating, for example, a thermoplastic material into a flowable, viscous state and injecting the plasticated material into a mold cavity 24. The mold cavity 24 is defined by a pair of cooperating mold portions 18,20 that are movable relative to each other to open and close selectively the mold cavity 24.

Mold portions 18,20 are supported for relative movement by a mold traversing and clamping system 11 that includes a stationary platen 14 connected to frame 12 to support securely mold portion 18. Stationary platen 14, which is a generally rectangular structure, is rigidly secured to frame 12 so that it is integrated with the frame 12, and includes a planar face 16 to which mold portion 18 is securely connected. Mold portion 20 is secured to a movable platen 22 that is slidably guided and supported on rails 28 that extend between stationary platen 14 and support member 26. The die height platen 32 is supported by rails 29 on frame 12 which extend from the support members 26 to the end of the frame 12. As will be more fully described hereinafter, the mold traversing and clamping system 11 is a toggle-type system that is provided for traversing mold portion 20 toward and away from mold portion 18, and for securely holding together mold portions 18 and 20 when the plasticated material is injected into and contained within mold cavity 24 under high pressure.

Figure 4:
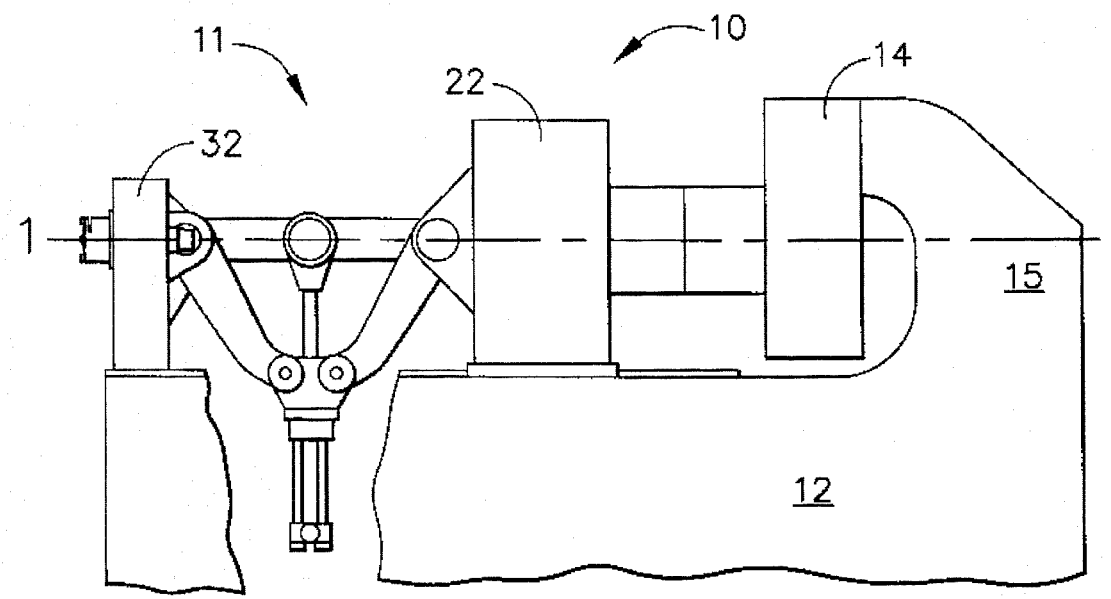
FIG. 4 is a partial side elevational view similar to that of FIG. 1, with various components and detail removed to show clearly the line of force acting on the frame construction as disclosed by the present invention.
Figure 5:
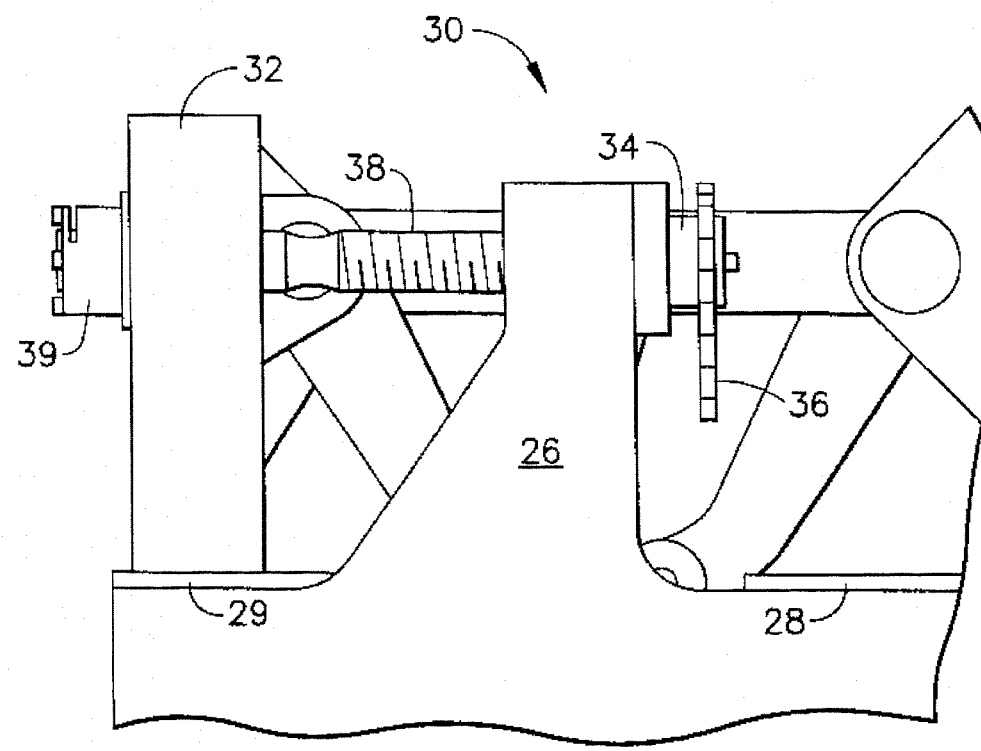
FIG. 5 is an enlarged partial view of the structure shown in FIG. 1, illustrating in greater detail the elements of the die height adjustment mechanism according to the present invention.

The machine frame 12 has a unique geometry particularly suited to a molding machine designed to operate without tie bars. More specifically, the stationary platen 14 and/or the end 15 of the frame 12 that supports the stationary platen 14 are configured to maintain a constant moment of inertia (throughout the molding cycle) relative to the line of force applied by the clamp system 11, as shown by the line 1—1 in FIG. 4; therefore, the composite projected moment of inertia of the elements affected by the force remains constant as the clamp force is applied. When the requisite tonnage is applied, the end 15 of the frame 12 in conjunction with the stationary platen 14 displaces linearly, i.e. parallel to the line of force 1—1. As a result, the force on the mold portions 18,20 is equalized and there is no tendency to flash at the parting line or fill multi-cavity molds unevenly. The specific geometry shown in the figures is intended to be generally illustrative of a configuration that will produce the desired results. Computer analysis of various composite geometries indicates that the construction of stationary platen 14, the frame end 15, and the body of frame 12 all interact to produce the desired net displacement of the mold mounting surface.

Figure 2:
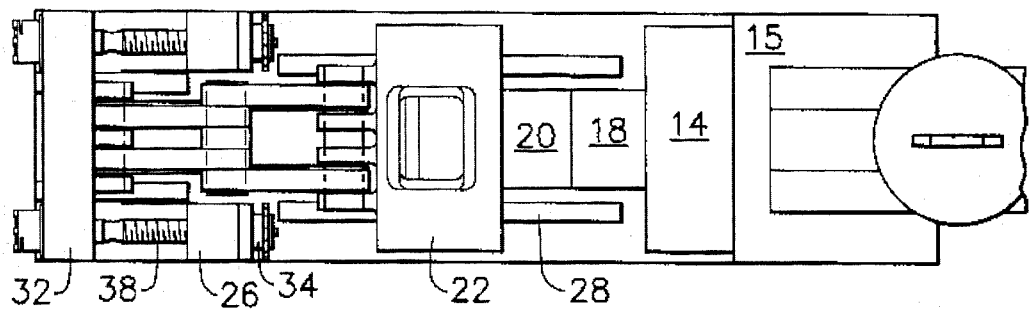
FIG. 2 is an partial top plan view of the injection molding machine shown in FIG. 1, primarily illustrating the clamp mechanism.
Figure 3:
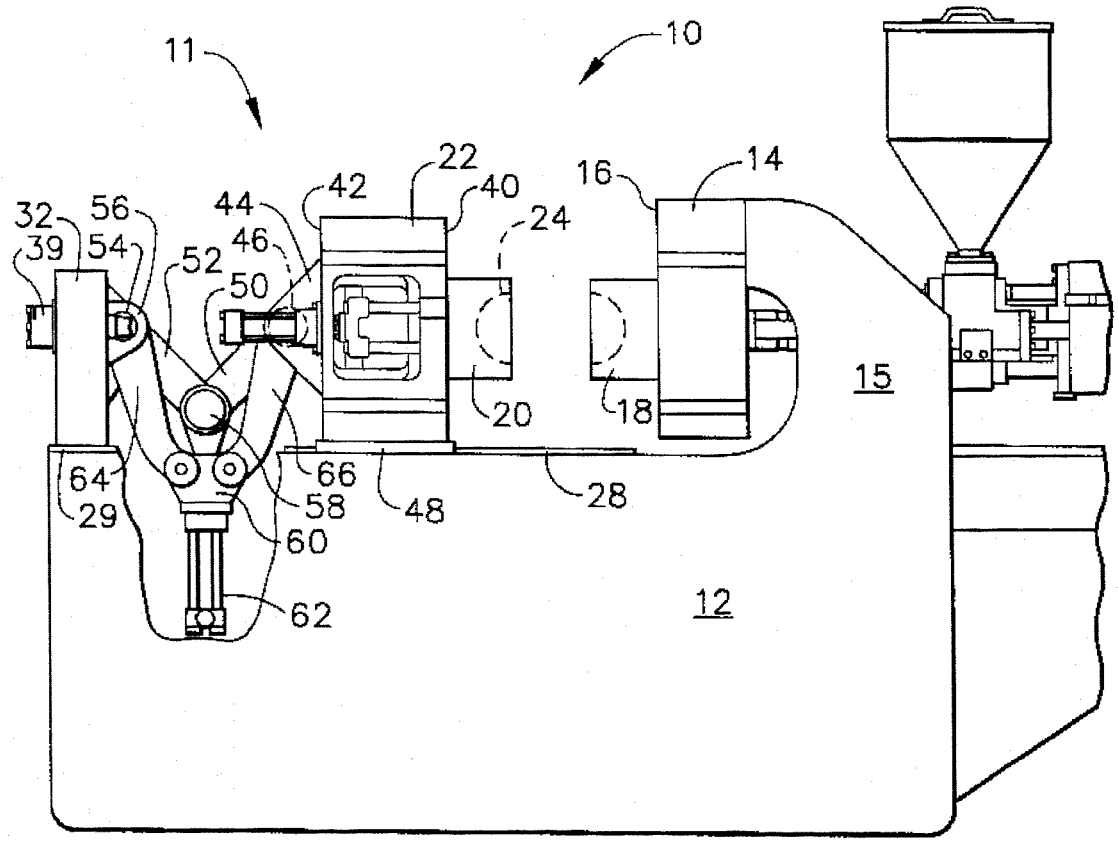
FIG. 3 is a partial side elevational view similar to that of FIG. 1, but showing the clamp at its fully retracted position with the mold portions open.

Positioned adjacent stationary platen 14 on the side opposite from face 16 is injection unit 13, only a small portion of which is shown in FIGS. 2 and 3, which plasticates, for example, solid or powder thermoplastic material to provide a molten, flowable mass suitable for injection into mold cavity 24. Injection unit 13 includes a tubular barrel that carries a rotatable screw (not shown) to aid in plasticating the material, to convey material toward mold cavity 24, and to inject the material into mold cavity 24 under high pressure. Since the structure and operation of the plastication and injection unit 13 are well known to those skilled in the art and not critical to the understanding of the present invention, no further description of that unit will be provided herein.

In place of the four parallel, cylindrical tie rods that are typically used in an injection molding machine, the frame 12 is designed to have sufficient structural integrity to maintain the proper relationship of the machine elements during the molding process. For the open frame machine 10 of the present invention, two pairs of rails 28,29 are provided on the frame 12 and have their respective longitudinal axes disposed in a generally parallel configuration. The rails 28 provide support and guidance for the movable platen 22, as described above, and preferably extend from near the face 16 of stationary platen 14 beneath the movable platen 22 and terminate near the support member 26. The rails 29 provide support and guidance for the die height platen 32, as noted previously, and preferably extend from near the support member 26 under the die height platen 32 to the proximate end of the frame 12 (see FIGS. 2 and 3).

A key system of the present invention is the die height adjustment mechanism 30, including die height platen 32, which remains essentially stationary during the molding cycle. However, die height platen 32 is adjustable toward and away from stationary platen 14 by means of adjusting nuts 34 that are rotatably carried by support members 26. The nuts 34 can be rotated by any suitable means, such as a motor driven chain 36 that passes around and drives sprockets operatively connected to adjusting nuts 34. Adjusting nuts 34 engage external threads formed on the ends of adjustment rods 38 and are threadedly carried by the associated adjustment rod 38. The opposite ends of adjustment rods 38 are secured to die height platen 32 by nuts 39. Rotation of nuts 34 causes die height platen 32 to be moved linearly relative to the support members 26 (and stationary platen 14) in order to accommodate molds of different thicknesses.

Movable platen 22 is slidably carried on rails 28 by means of linear bearings 48 of a design well known in the art which engage the rails 28 and accurately guide the platen 22 during its traversing movement. Movable platen 22 is positioned between die height platen 32 and stationary platen 14, and includes a front face 40 that is opposite face 16 of stationary platen 14 and carries mold portion 20. The mold portion 20 engages mold portion 18 to define one or more mold cavities 24 into which the molten thermoplastic material is injected to form the desired parts. Rear face 42 of movable platen 22 carries a plurality of laterally spaced pillow blocks 44 that have aligned bores to carry rotatably a front pivot pin 46 which is a part of the toggle type clamping apparatus 11 for advancing or retracting movable platen 22 with respect to stationary platen 14. Since the movable platen 22 connects to the toggle linkage by means of pivot pin 46, the force applied through the clamp mechanism 11 is only along line 1—1, there are no force components which would tend to displace the platen 22 in another direction.

The toggle type clamping apparatus 11 is in the form of a conventional single toggle arrangement that includes a pair of toggle front links 50 that have one end carried on front pivot pin 46, and a pair of toggle rear links 52 that have one end pivotally carried on a rear pivot pin 54. Pin 54 is, in turn, carried in aligned bores formed in each of a plurality of laterally spaced die height platen pillow blocks 56. The respective toggle front and rear links are inter connected at their innermost free ends by a center pivot pin 58 that is operatively connected with a toggle actuator, such as the piston rod (not shown) of a hydraulic cylinder 62, or an electric motor with an integral linear actuator, such as a ball screw. For the clamping apparatus 11 as illustrated, cylinder 62 is supported from a crossmember 60 that is pivotally connected with a pair of support links 64,66 that have their opposite ends respectively pivotally carried by rear pivot pin 54 and front pivot pin 46.

In FIGS. 1 and 2, movable platen 22 is shown in its fully extended (closed) position relative to die height platen 32. The toggle actuator has been operated (the piston rod extended to its uppermost position) to cause the axis of center pivot pin 58 to lie on a line extending between the axes of front and rear pivot pins 46 and 54, so that respective toggle links 50 and 52 are collinear. When movable platen 22 is in the position shown in FIG. 2, mold portions 18 and 20 are in contact and define mold cavity 24, into which the molten thermoplastic material is injected under high pressure. The aligned toggle links 50 and 52 serve to maintain the position of movable platen 22 relative to stationary platen 14, so there is resistance to separation of the mold portions 18,20 (clamping force) due to the force imposed on the surfaces of the mold cavity 24 by the injected material. These elements of the machine 10 establish the line of force that is required for the molding process. As shown by the figures, this line force and the configuration of the end 15 of frame 12 are matched so that the composite moment of inertia of the supporting structure relative to the line of force remains relatively constant as the clamp force is applied or removed. Accordingly, any displacement for the platen 14 and mold portion 18 caused by the clamping force is parallel to the line of force and does not affect the parallel alignment of the mold portions 18,20.

After the injected material has cooled sufficiently, the toggle actuator is operated in reverse (the piston rod retracted into cylinder 62), thereby drawing center pivot pin 58 toward cylinder 62 and causing movable platen 22 to move away from stationary platen 14 and toward the die height platen 32, to separate the mold portions and permit the molded part to be removed from mold cavity 24, as shown in FIG. 3. In this open position, movable platen 22 is completely retracted and is in its furthest position relative to stationary platen 14; the piston rod is drawn into cylinder 62 and toggle front and rear links 50, 52 are angularly oriented.

The apparatus of the present invention thus provides for effective molding in an open frame injection molding machine. Although particular embodiments of the present invention have been illustrated and described, it will be apparent to those skilled in the art that various changes and modifications can be made without departing from the spirit of the present invention. For example, geometries different from that shown for the stationary platen end 15 of the frame 12 could be designed to provide the desired linear displacement. Alternatively, as noted previously, variations in the specific elements of the die height adjustment mechanism 30 could be made without substantially effecting the way adjustment is accomplished. It is therefore intended to encompass within the appended claims all such changes and modifications that fall within the scope of the present invention.

What is claimed is:

1. An open frame injection molding machine comprising:
   a frame having a mold support end and a clamp end,
   a stationary platen structurally integrated with the frame at the mold support end,
   an intermediate support member structurally integrated with the frame between the clamp end and the stationary platen, such that clamping forces generated during a molding cycle are transmitted through the stationary platen and intermediate support member to the frame,
   a first set of rails attached to the frame and generally extending from the stationary platen to the intermediate support member,
   a second set of rails attached to the frame and generally extending from the intermediate support member to the clamp end of the frame,
   a movable platen located between the intermediate support member and stationary platen, the movable platen resting on and guided by the first set of rails,
   a die height platen resting on the second set of rails, such that the die height platen is positioned between the intermediate support member and the clamp end of the frame,
   die height adjustment means for connecting the die height platen to the intermediate support member and for altering the relative distance between the die height platen and the stationary platen, and
   a clamp mechanism including a toggle linkage connecting the die height platen and the movable platen, the clamp mechanism configured to provide reciprocating motion to the movable platen.

2. The injection molding machine according to claim 1 wherein the stationary platen and mold support end of the frame are geometrically configured to maintain a relatively constant moment of inertia relative to a line of force applied during the molding cycle.

3. The injection molding machine according to claim 1 wherein the die height adjustment means includes a plurality of threaded rods connecting the die height platen and intermediate support member.

4. An open frame injection molding machine comprising:
   a frame having a mold support end and a clamp end, the mold support end having a configuration that maintains a relatively constant moment of inertia relative to a line of force applied during a molding cycle,
   a stationary platen structurally integrated with the frame at the mold support end, and
   an intermediate support member structurally integrated with the frame between the stationary platen and the clamp end, such that forces generated during the molding cycle are transmitted through the stationary platen and intermediate support member to the frame.

5. The injection molding machine according to claim 4 further comprising:
   a movable platen located between the intermediate support member and stationary platen,
   a die height platen located between the intermediate support member and the clamp end of the frame, die height adjustment means for connecting the die height platen to the intermediate support member and for altering the relative distance between the die height platen and the stationary platen, and a clamp mechanism including a toggle linkage connecting the die height platen and the movable platen, the clamp mechanism configured to provide reciprocating motion to the movable platen.

6. An open frame injection molding machine comprising:

a frame that supports a stationary mold mounting surface, a movable mold mounting surface that is essentially parallel to the stationary mold mounting surface, and a clamp mechanism, wherein at least a portion of the frame is geometrically configured to maintain a relatively constant moment of inertia relative to a line of force applied by the clamp mechanism during a molding cycle, so that the two mold mounting surfaces remain essentially parallel throughout the molding cycle.

* * * * *